(12) United States Patent
Muffley et al.

(10) Patent No.: US 10,962,072 B2
(45) Date of Patent: Mar. 30, 2021

(54) FRICTION LINING AND BRAKE PAD FOR A BRAKING SYSTEM

(71) Applicant: Federal-Mogul Motorparts LLC, Southfield, MI (US)

(72) Inventors: David Douglas Muffley, Clear Springs, MD (US); David Thornton Pindar, Hayfield (GB); Daniel Evan Berard, Murfreesboro, TN (US); Kazuhiko Isono, Hachioji (JP)

(73) Assignee: Federal-Mogul Motorparts LLC, Southfield, MI (US)

( * ) Notice: Subject to any disclaimer, the term of this patent is extended or adjusted under 35 U.S.C. 154(b) by 0 days.

(21) Appl. No.: 15/378,961

(22) Filed: Dec. 14, 2016

(65) Prior Publication Data

US 2017/0175838 A1  Jun. 22, 2017

Related U.S. Application Data

(60) Provisional application No. 62/268,826, filed on Dec. 17, 2015.

(51) Int. Cl.
| | | |
|---|---|---|
| *F16D 69/00* | (2006.01) | |
| *F16D 65/092* | (2006.01) | |
| *F16D 55/225* | (2006.01) | |

(52) U.S. Cl.
CPC ......... *F16D 69/00* (2013.01); *F16D 65/092* (2013.01); *F16D 55/225* (2013.01); *F16D 2069/004* (2013.01)

(58) Field of Classification Search
CPC ...... F16D 69/00; F16D 65/092; F16D 55/225; F16D 2069/004
See application file for complete search history.

(56) References Cited

U.S. PATENT DOCUMENTS

| | | | |
|---|---|---|---|
| 2,150,186 A | * | 3/1939 | Pope ...................... F16D 65/02 188/261 |
| 2,438,483 A | * | 3/1948 | Tack ..................... F16D 65/092 188/234 |
| 2,849,092 A | | 8/1958 | Foster |
| 4,027,758 A | | 6/1977 | Gustavsson et al. |

(Continued)

FOREIGN PATENT DOCUMENTS

| | | |
|---|---|---|
| CN | 2182903 Y | 11/1994 |
| CN | 101749346 A | 6/2010 |

(Continued)

OTHER PUBLICATIONS

International Search Report for International Application No. PCT/US2016/067367, dated Mar. 31, 2017, 3 pages.

(Continued)

*Primary Examiner* — Melanie Torres Williams
(74) *Attorney, Agent, or Firm* — Reising Ethington P.C.

(57) ABSTRACT

A friction lining for a brake pad of a braking system includes a solid body of friction material having plurality of slots intersecting at a vortex zone formed as a circular recess in the friction lining. The slots open into the vortex zone at offset locations to promote circulation of air within the vortex zone. The slots extend along a horizontal arc that follows the curvature of a rotor of the braking system when in use. Vertical slots may be included that also open into the vortex zone at offset locations.

18 Claims, 10 Drawing Sheets

(56) References Cited

U.S. PATENT DOCUMENTS

| | | | |
|---|---|---|---|
| 5,388,675 A | 2/1995 | Kahr et al. | |
| 5,564,533 A * | 10/1996 | Parsons | F16D 55/22 |
| | | | 188/250 E |
| 5,816,901 A * | 10/1998 | Sirany | B24B 5/065 |
| | | | 451/415 |
| 6,119,828 A * | 9/2000 | Parsons | F16D 65/092 |
| | | | 188/250 E |
| 6,478,130 B2 * | 11/2002 | Knueve | F16D 69/04 |
| | | | 192/107 R |
| D624,859 S * | 10/2010 | Kahan | D12/180 |
| 2006/0225975 A1* | 10/2006 | Pfaff | F16D 65/0037 |
| | | | 188/250 E |
| 2007/0034462 A1 | 2/2007 | Themelin et al. | |
| 2011/0114438 A1 | 5/2011 | Sudau et al. | |
| 2012/0085597 A1 | 4/2012 | Narayanan, V | |
| 2012/0227234 A1 | 9/2012 | Liu et al. | |
| 2015/0159715 A1* | 6/2015 | Plantan | F16D 65/827 |
| | | | 188/78 |
| 2016/0003317 A1* | 1/2016 | Buxton | F16D 69/00 |
| | | | 188/250 B |

FOREIGN PATENT DOCUMENTS

| | | |
|---|---|---|
| CN | 202176648 U | 3/2012 |
| CN | 203374713 U | 1/2014 |
| CN | 203604518 U | 5/2014 |
| CN | 103883653 A | 6/2014 |
| CN | 104832557 A | 8/2015 |
| DE | 10200455 A1 | 7/2003 |
| DE | 102007037612 A1 | 2/2009 |
| FR | 1340925 A * | 10/1963 ............. F16D 65/08 |
| GB | 1006500 A | 10/1965 |
| JP | 02031030 A * | 2/1990 |
| JP | H1137190 A | 2/1999 |
| JP | 2000145848 A | 5/2000 |
| JP | 2007024286 A | 2/2007 |
| JP | 2008281060 A | 11/2008 |
| JP | 2014070651 A | 4/2014 |
| KR | 20050100980 A | 10/2005 |
| RU | 2098686 C1 | 12/1997 |
| RU | 2154207 C1 | 8/2000 |

OTHER PUBLICATIONS

Written Opinion for International Application No. PCT/US2016/067367, dated Mar. 31, 2017, 10 pages.
European Search Report corresponding to European application No. EP 16876861, dated Jun. 26, 2019, 6 pages.
Russian Search Report corresponding to Russian application No. RU 1810875, dated Jul. 9, 2019, 2 pages.
Chinese Office Action with English translation corresponding to CN application No. 201680082086.4, dated Jul. 29, 2019, 17 pages.
Chinese Office Action with English translation corresponding to CN application No. 201680082086.4, dated May 7, 2020, 12 pages.
Brazilian Office Action with English translation corresponding to BR application No. BR112018012080, dated Mar., 2020, 6 pages.
Korean Office Action with English translation corresponding to KR application No. 10-2018-7018991, dated Dec. 11, 2019, 6 pages.
Indian Office Action corresponding to KR application No. 201837023925, dated Nov. 21, 2019.

* cited by examiner

FRICTION LINING AND BRAKE PAD FOR A BRAKING SYSTEM

CROSS-REFERENCE TO RELATED APPLICATIONS

This application claims priority to U.S. Provisional Patent Application Ser. No. 62/268,826, filed on Dec. 17, 2015, the entire contents of which are hereby incorporated by reference.

TECHNICAL FIELD

This invention generally relates to friction linings and brake pads for braking systems, and more particularly, to friction linings having cooling slots.

BACKGROUND

Braking systems for vehicles, such as disc braking systems, use brake pads having friction linings to inhibit rotation of the vehicle wheel. The friction surface of the friction lining is subject to high clamping loads and a resultant tangential friction force that can generate a significant amount of heat. Excessive heat may lead to reduced performance and various unwanted effects. For example, brake fade, caused by a buildup of heat at the friction surface, can reduce stopping power. The temperature of the friction lining may also impact the wear resistance and ultimately the life of the brake pad. Accordingly, improved cooling of the friction lining is desirable.

SUMMARY

An object of the invention is to address at least some of the brake pad performance issues noted above.

According to one embodiment, there is provided a friction lining for a brake pad, which includes a solid body of friction material having plurality of slots joined at a vortex zone. In at least some embodiments, the vortex zone comprises a recess that extends from a friction surface of the solid body down into the solid body, with the plurality of slots comprising at least first and second slots that open into the vortex zone along non-intersecting paths at locations that are offset from each other. In more specific embodiments, the recess have a circular shape and the first and second slots each open into the vortex zone in a substantially tangential direction relative to the circular shape of the recess to thereby provide tangential entry/exit passages such that air entering the vortex zone from one of the slots flows in a curved direction within the vortex zone before exiting via the other slot. This may help facilitate cooling of the friction lining and lead to improved performance and increased pad life.

In other embodiments, the friction lining of the preceding paragraph may include any one or more of the following features in any technically feasible combination:
- at least one of the slots is an arced horizontal slot configured to follow a path of a point on a brake rotor with which the friction lining contacts when in use.
- at least one of the plurality of slots has a different depth or width than another one of the plurality of slots.
- the arced slots are offset from each other with respect to a height of the solid body.
- the plurality of slots are configured to facilitate circular airflow within the vortex zone.
- the solid body has a height across a friction surface of the solid body, and the vortex zone has a diameter at the friction surface that is between 38% and 55%, inclusive, of the height.
- the vortex zone extends from the friction surface down into the solid body to a depression surface at a depth below the friction surface, and wherein the thickness of the solid body at the depression surface is approximately 0.1 inches.
- at least one of the slots has a depth from a friction surface of the solid body that is between 50% and 75%, inclusive, of a depth of the vortex zone from the friction surface.

According to another embodiment, there is provided friction lining for a brake pad, comprising:
- a solid body of friction material having a length extending in a horizontal direction and a height extending in a vertical direction that is less than the length,
- the solid body having a horizontal slot extending from a leading edge of the solid body to a trailing edge of the solid body, the horizontal slot including a first slot extending inwardly from the leading edge and a second slot extending inwardly from the trailing edge,
- the solid body including a recess located at a central region of the solid body,
- wherein the first and second slots open into the recess in the solid body so as to permit airflow between the first and second slots via the recess,
- wherein the recess has a circular shape and extends into the solid body from a surface of the solid body down to a bottom of the recess,
- wherein the bottom has a depth from the surface of the solid body that is greater than a depth of each of the first and second slots, and
- wherein the first and second slots are offset relative to each other at the recess, with at least one of the first and second slots opening into the recess in a substantially tangential direction relative to the circular shape of the recess, whereby air entering the recess from at least one of the slots flows in a curved direction within the recess.

In other embodiments, the friction lining of the preceding paragraph may include one or more of the following features in any technically feasible combination:
- the surface of the solid body comprises a friction surface that bears against a brake rotor when in use.
- the recess extends only partially through the thickness of the solid body.
- at least one of the first and second slots has a different depth or width than the other one of the first and second slots.
- the solid body has a height across a friction surface of the solid body, and the recess has a diameter at the friction surface that is between 38% and 55%, inclusive, of the height.
- the thickness of the solid body at the bottom is approximately 0.1 inches.
- at least one of the first and second slots has a depth from a friction surface of the solid body that is between 50% and 75%, inclusive, of a depth of the vortex zone from the friction surface.

According to other aspects of the invention, there is provided a brake pad having a backing plate to which is attached a friction lining of the invention as described in any of the paragraphs above, as well as a braking system that includes such a brake pad.

According to another embodiment, there is provided a braking system that includes:
- a rotor having a disk shape with opposite sides extending radially to an outer circumference; and
- a brake pad having a friction lining and arranged relative to the rotor such that a friction surface of the friction lining bears against one of the sides of the rotor to inhibit rotation of the rotor when in use;
- wherein the friction lining has an arced horizontal slot formed from two offset slots interconnected at a central region of the friction lining such that, when in use, airflow entering one of the offset slots exits via the other of the offset slots; and
- wherein each of the offset slots extend along an arc that follows a path of a point on the rotor when in use; and
- optionally, the brake pad includes a vortex zone joining the two offset slots.

In other embodiments, the braking system of the preceding paragraph may include one or more of the following features in any technically feasible combination:
- the vortex zone comprises a recess having a circular shape that extends into the solid body from the friction surface of the friction lining down to a bottom of the recess, wherein the bottom has a depth from the surface of the solid body that is greater than a depth of each of the offset slots, and wherein the offset slots open into the recess in a substantially tangential direction relative to the circular shape of the recess, whereby air entering the recess from one of the offset slots flows in a curved direction within the recess before exiting the recess via the other offset slot.
- the friction lining has a radially-extending height and the vortex zone has a diameter at the friction surface that is between 38% and 55%, inclusive, of the height.
- the friction lining includes a pair of vertically extending offset slots each extending from an edge of the friction lining to the vortex zone.
- the horizontal slot extends across an entire horizontal length of the friction lining

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

Figure 6:
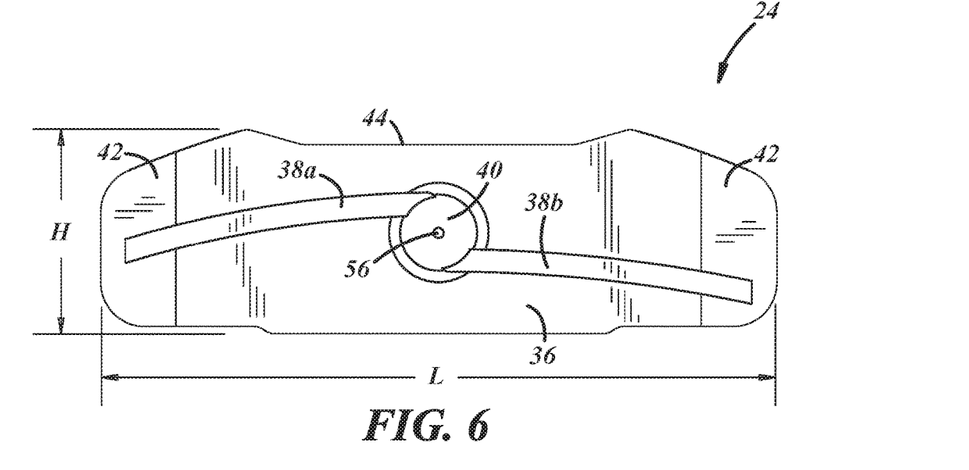
FIG. 6 shows a friction lining in accordance with one embodiment.

The friction linings described herein may be used with brake pads in vehicle braking systems to assist airflow across the friction lining. The friction lining includes airflow features such as one or more horizontal slots formed in the friction surface that may be arced so as to follow the rotating path of a point on the rotor in a disc braking system with which the friction lining is used. As used herein, the terms "horizontal" and "vertical" and their conjugates, when used in relation to the disclosed friction linings and brake pads, are references to those components and their features as they exist when the components are disposed in an orientation such as shown in FIG. 6 in which the longer, lengthwise extent of the component is oriented horizontally and the shorter extent (height) is oriented vertically, regardless of the ultimate orientation of the components when installed in a vehicle braking system.

In an embodiment, the friction lining comprises a solid body of friction material that includes a plurality of slots joined at a vortex zone. The vortex zone may be a circular shaped recess (e.g., conical, cylindrical, or hemispherical) that is generally defined by an interior wall that facilitates a circular or otherwise curved airflow pattern to help cool the friction lining. In one particular implementation, two horizontally extending slots join at a vortex zone near the center of the friction lining. The friction lining may also include a plurality of vertically extending slots that also join at the vortex zone. Additionally, a friction lining may include more than one vortex zone.

Figure 1:
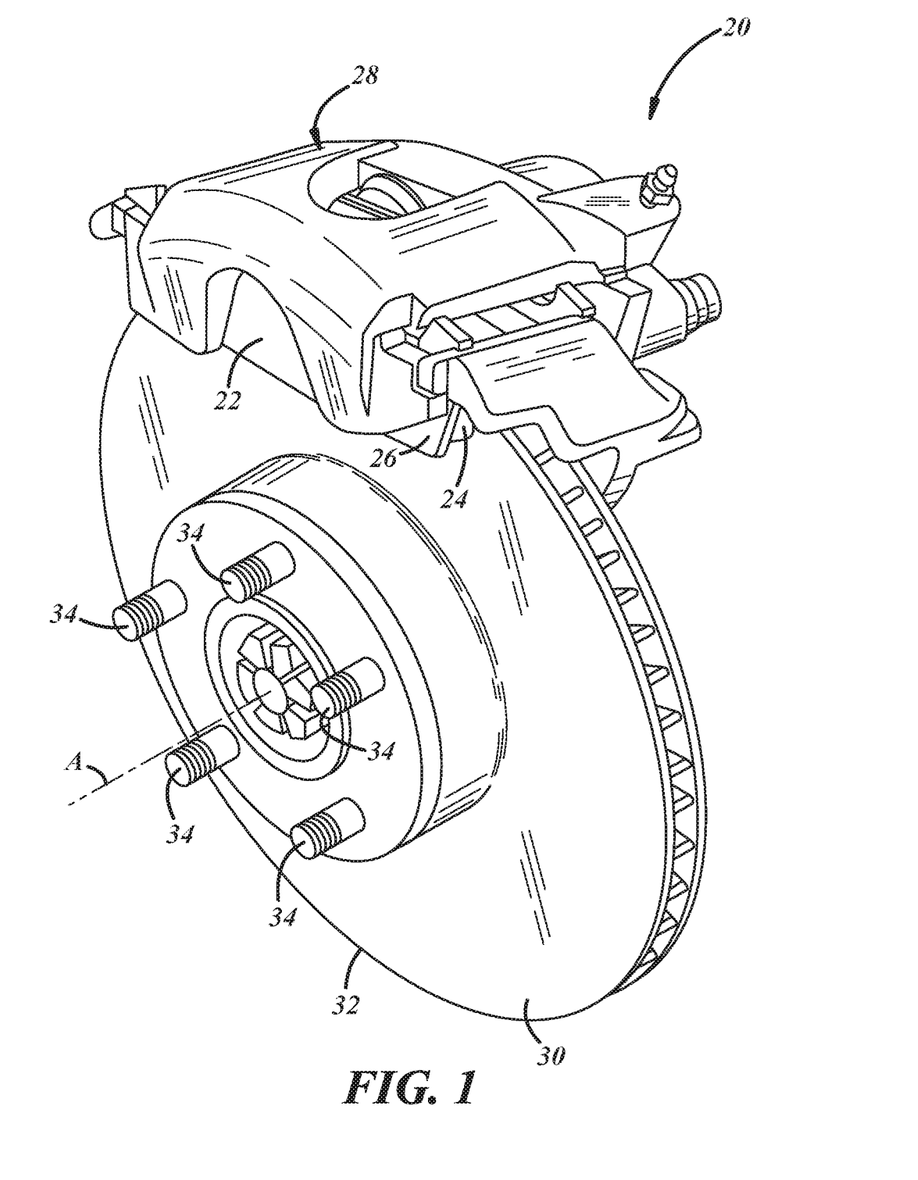
FIG. 1 shows a braking system in accordance with one embodiment.

FIG. 1 illustrates one embodiment of a braking system 20. Braking system 20 is a disc braking system that uses a rotatable brake element in the form of a rotor 30. However, the friction linings described herein may be adapted for or used with other braking systems, such as drum braking systems that use a metal drum as the rotatable brake element. The braking system 20 includes a brake pad 22 having a friction lining 24 and a backing plate 26. Caliper 28 holds the brake pad 22 and another brake pad (not shown) on opposing sides of rotor 30. The rotor 30 has an outer perimeter 32 and is connected to an axle hub via lug bolts 34. A vehicle wheel (not shown) can be attached over lug bolts 34 so that it rotates about central axis A. The illustrated rotor 30 is ventilated; however, this is not necessary as any operable rotor design may be employed, such as generally planar rotors or slotted rotors, to cite a few examples. In operation, the friction linings 24 of the brake pads 22 are clamped against opposing sides of the rotor 30 such that the friction surface of each friction lining bears against a side of the rotor to inhibit rotation of the rotor and, thus, the vehicle wheel.

Figure 2:
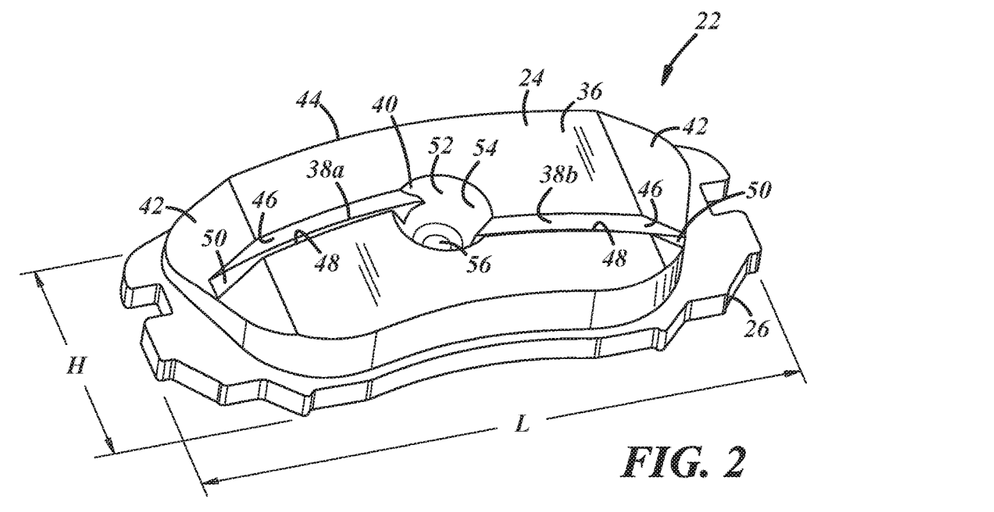
FIGS. 2-3 show brake pads with friction linings in accordance with one embodiment.
Figure 3:
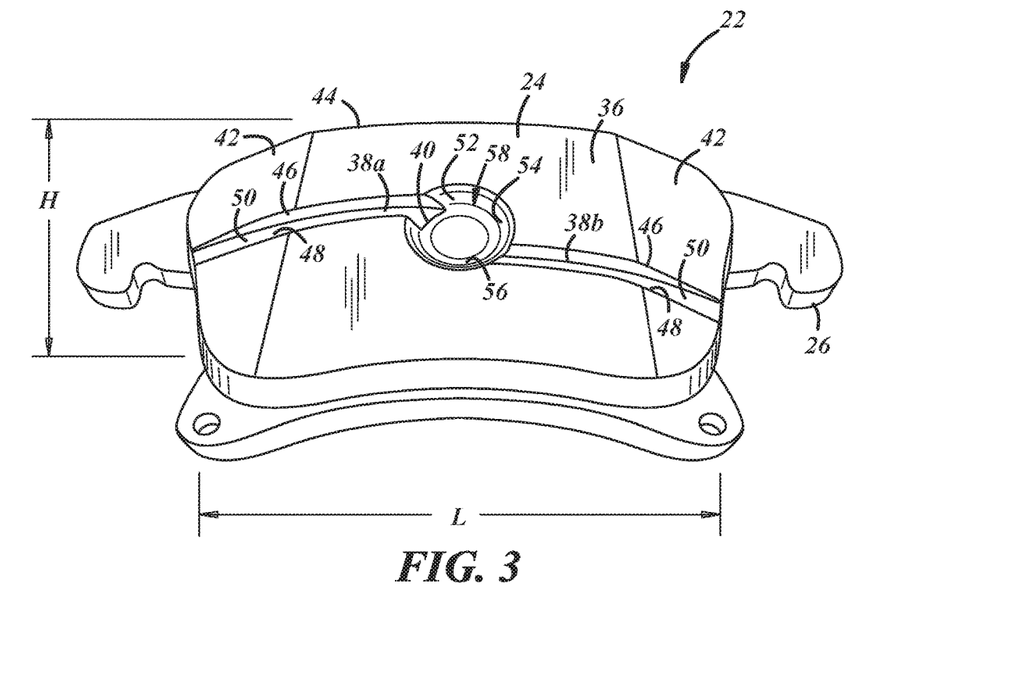

FIGS. 2 and 3 show brake pads 22 that may be used with a braking system, such as braking system 20. The brake pad 22 includes friction lining 24 that is attached to backing plate 26. In this embodiment, the friction lining 24 is attached to a steel backing plate 26. However, in another embodiment, the friction lining may be co-molded or otherwise formed with a backing plate, such as a composite backing plate. Other configurations are certainly possible. The friction lining 24 and backing plate 26 extend lengthwise with a length L in a horizontal direction that generally matches the circumferential direction of the rotor 30 when in use as shown in FIG. 1. They also extend vertically with a height H that matches the radial direction of the rotor. The friction lining 24 comprises a body of solid friction material which includes a friction surface 36 that is clamped against a rotor, such as rotor 30, to inhibit rotation of a vehicle wheel during operation. The friction lining 24 has various airflow features formed in the friction surface 36. The airflow features, such as one or more horizontal slots 38a, 38b (collectively, 38) and a vortex zone 40, may help facilitate or direct airflow to cool the friction lining 24. Airflow features may be formed in the friction surface by machining the features in the friction surface of a previously manufactured or partially manufactured friction lining, or they may be molded in depending on the desired manufacturing method and/or the type of material used for the friction lining. The friction lining 24 may or may not include other features, such as chamfers 42 or different configurations for outer perimeter 44.

In the embodiments shown in FIGS. 2 and 3, the horizontal slots 38a, 38b each include two side walls 46, 48 and a bottom wall 50. As an alternative to a squared or angled cross-section, the slots may have a curved shape, a U- or V-shape, or any other operable shape. Further, the horizontal slots 38 may have a variable depth and/or a variable width. For example, decreasing the width or depth of the slot near the vortex zone 40 may result in a higher speed of airflow into the vortex zone 40 due to the Venturi effect.

As depicted, the friction lining 24 may include two horizontal slots 38a, 38b joined at the vortex zone 40. The two horizontal slots 38a, 38b together form a single lengthwise slot that generally spans the length L of the friction lining 24, interrupted by the vortex zone 40. The two slots 38a, 38b may be offset from each other with respect to the height H of the friction lining 24. In one embodiment, the horizontal slot 38a closer to the top edge of the friction lining begins at the leading edge of the lining (i.e., at the location where points on the rotor surface first come into contact with the friction lining when braking during rotor rotation). The other offset horizontal slot 38b begins at the trailing edge of the lining and joins. The same brake pad 22 may be used on the other side of the rotor in which case the inner or lower slot 38b closest to the bottom edge of the friction lining 24 begins at the leading edge of the lining. Alternatively, the slot positions relative to the height H of the friction lining may be switched for this second brake pad. In another embodiment, one or more horizontal slots generally extend across the length L of the friction lining, or two horizontal slots may be situated on either side of a vortex zone so they are generally aligned with respect to the height H of the friction lining. Other slot designs and configurations are certainly possible.

The lengthwise extent of the horizontal slots 38 can vary depending on the particular friction lining. The lengthwise extent of the horizontal slots 38 may depend on the slot depth and/or the degree to which chamfer 42 is angled with respect to the friction surface 36. For example, the horizontal slots 38 may extend to the outer perimeter 44 of the friction lining 24 if there are no chamfers or a slightly angled chamfer. Alternatively, one or more horizontal slots 38 may terminate within the chamfer if the angle to which the chamfer 42 relates to the friction surface 36 is higher. It may be preferable to avoid creating sharp points in the horizontal slots 38 toward the edge of the friction lining 24, as the material could chip during machining or during operation. In one embodiment, which is discussed further below with respect to FIG. 8, the angle at which the slot terminates with an edge of the friction lining is greater than approximately 54°.

The horizontal slots 38 may extend along one or more arcs. In an embodiment, the arcs of each of the horizontal slots 38a, 38b mimic the outer circumference 32 of the rotor 30. That is, these arcs (which can be the same or somewhat different than each other) may have generally the same radius of curvature as the location on rotor 30 where the friction lining 24 contacts the rotor. As a result, the slots will be parallel to the outer perimeter 32 of the rotor 30 when installed. In this way, the horizontal slots 38 follow the curvature of the rotor 30 even though in some embodiments they may be designed such that, when installed, they do not have the exact same radius as rotor 30 at the point on the rotor where the slot is located or may have different curvatures than each other or may not share the same radial center point as that of the rotor. This configuration of an arced, horizontal slot may help facilitate airflow, as the rotor may work as a fan to pull air through the slots and vortex zone as it rotates past the friction lining. Accordingly, the horizontal slots may be configured to be generally in line with the rotational path of the spinning rotor and with the concomitant airflow produced by the rotor. Additionally, the rotor may have fins or features that act as an air pump to help encourage airflow through the slots.

As shown in FIG. 2, two horizontal slots 38a, 38b are joined at the vortex zone 40. The vortex zone 40 is a recess that includes an interior wall 52 that extends from the friction surface 36 into the body of the friction lining 24. The interior wall 52 may include a radial surface 54 and a depression surface (or bottom) 56. The depression surface 56 may be curved, planar, or have some sort of surface treatment, one or more dimples, etc. The interior wall 52 generally defines a conical recess extending from the friction surface 36 into the body of the friction lining 24. The conical recess is one of a number of different circular shapes that may be used for the interior wall 52 to help facilitate or encourage a circular airflow pattern that operates to cool the friction lining 24. Apart from conical, other circular shapes include cylindrical and hemispherical, as well as curved shapes that are not necessarily piece-wise continuous, such as faceted surfaces that present a generally circular conformation. For the cone shape vortex zone depicted, it may have a truncated shape such that it has a circular, flat bottom 56, as shown. However, it is possible for the cone shape to end at a point or have more of a spherical configuration at the bottom 56. The interior wall 52, and more particularly, the radial surface 54 of the vortex zone 40 may be generally smooth, as shown in FIG. 2, or may include various features such as circumferential grooves 58, as shown in FIG. 3. The vortex zone 40 is located at a central region of the friction lining 24. And in at least some embodiments, the vortex zone 40 is situated at or near the center of the friction lining 24.

The openings of the two slots 38a, 38b into the vortex zone 40 are offset by about 180° and provide entry/exit passages that are positioned substantially tangential relative to the vortex zone to help create the circulating airflow therein. Thus, these slots open in the vortex zone along non-intersecting paths at locations that are offset from each other. This, in conjunction with the circular shape of the vortex zone 40, may help to cause air entering the vortex zone from one of the slots to flow in a curved direction within the vortex zone before exiting via the other slot. And as shown, in at least some particular embodiments the outermost edge or wall of each of the slots 38 (i.e., side wall 46 of the upper horizontal slot 38a, and side wall 48 of the lower horizontal slot 38b) can be located such that it meets the interior wall 52 of the vortex substantially at a tangent of the interior wall 52.

Figure 4:
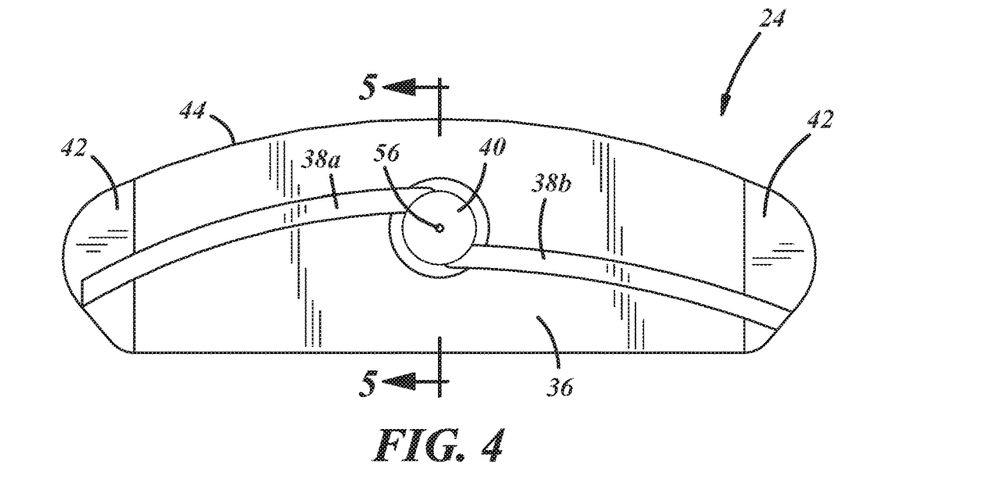
FIG. 4 illustrates a friction lining in accordance with one embodiment.
Figure 5:
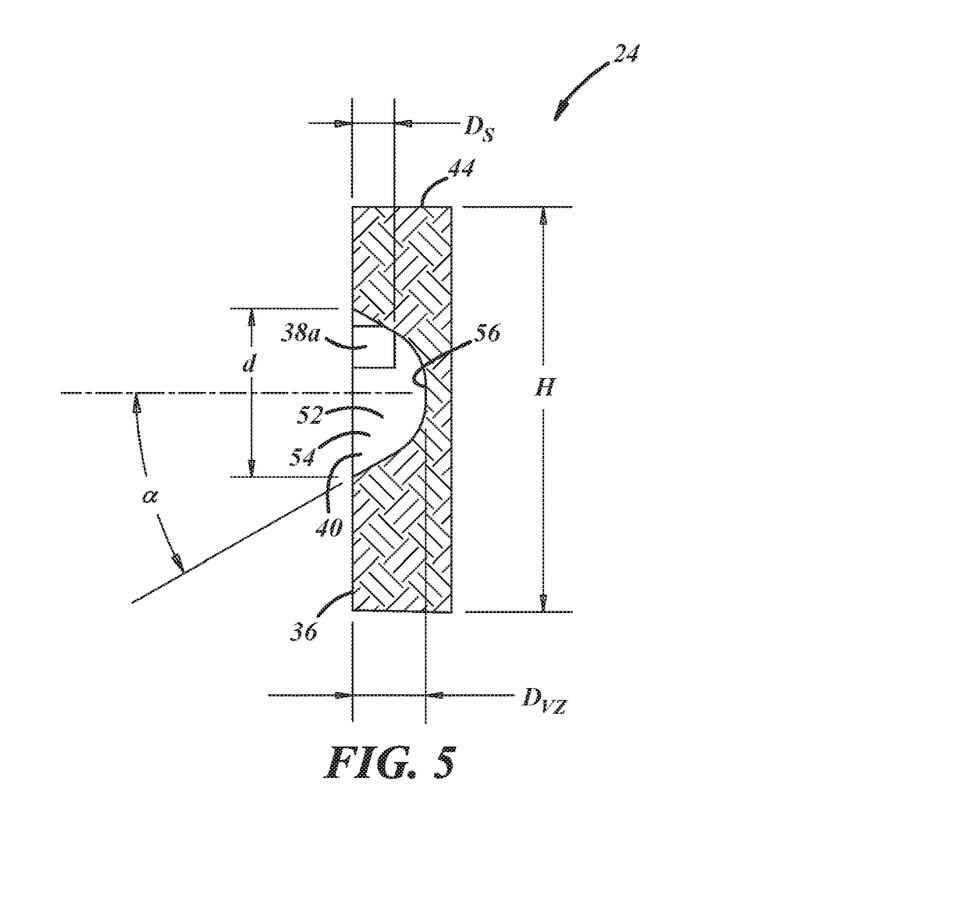
FIG. 5 is a cross-sectional view of the friction lining of FIG. 4 taken along line 5-5 of FIG. 4.

FIGS. 4 and 5 are drawings of a friction lining 24 in accordance with one embodiment. In these figures and the remaining figures, certain reference numerals may be omitted for clarity purposes. FIG. 5 is a cross-sectional view of the friction lining 24 of FIG. 4 taken along line 5-5 in FIG. 4. As shown in this embodiment, the vortex zone 40 is a conically shaped recess with a truncated bottom 56. The angle α of the vortex zone 40, in at least some embodiments, is between 25° and 35°, inclusive, and, as depicted in FIG. 5, may be approximately 30°. The inner radial wall 54 and flat bottom 56 meet at a radiused corner. In some embodiments, for a friction lining thickness of between about 0.35 and 0.53, the depth Dvz may be between about 0.25 and 0.43 with an opening diameter d of between about 0.65 and 0.92 and the bottom 56 having a diameter of between about 0.08 and 0.12 with a radiused corner of between about 0.18 and 0.32. In other embodiments, for a friction lining thickness of between about 0.28 and 0.42, the depth Dvz may be between about 0.18 and 0.32 with an opening diameter d of between about 0.51 and 0.67 and the bottom 56 having a diameter of between about 0.08 and 0.1 with a radiused corner of between about 0.18 and 0.25. FIG. 5 also shows the depth Ds of the horizontal slot 38 as it relates to the depth Dvz of the vortex zone (i.e., the depth of the bottom 56 of the vortex zone from the friction surface 36). As shown, the depth Dvz (of the bottom 56 of vortex zone 40 from the friction surface 36) is greater than the depth Ds of the slot 38. In at least some embodiments, the ratio of Ds to Dvz is between 1/2 and 3/4, inclusive, and in one particular embodiment, the ratio to Ds to Dvz is 2/3.

The diameter d of the vortex zone 40 may be dependent on the thickness of the friction lining. For example, it may be preferable to have approximately 0.1 inches of friction material between the depression surface 56 and the side of the friction lining opposing the friction surface 36. Therefore, depending on the desired angle α and/or depth Dvz, the diameter d of the vortex zone 40 may be adjusted so as to ensure enough friction material is left between the depression surface 56 and the side of the friction lining opposing the friction surface 36. The diameter d may also depend on the height H of the friction lining 24. The diameter d may be between 38% and 55%, inclusive, of the height H of the friction lining 24. In some embodiments, the diameter d is between 40% and 45%, inclusive, of the height H of the friction lining 24. And in one particular embodiment, the diameter d is 44% of the height H of the friction lining 24.

FIG. 6 shows another embodiment of friction lining 24 having two horizontal slots 38a, 38b that terminate within the chamfers 42. The vortex zone 40 is located at the center point with respect to the height H of the friction lining as well as with respect to the length L of the friction lining. In this embodiment, the horizontal slots 38a, 38b both terminate within the chamfers 42 instead of extending to the outer perimeter 44 of the friction lining 24.

Figure 7:
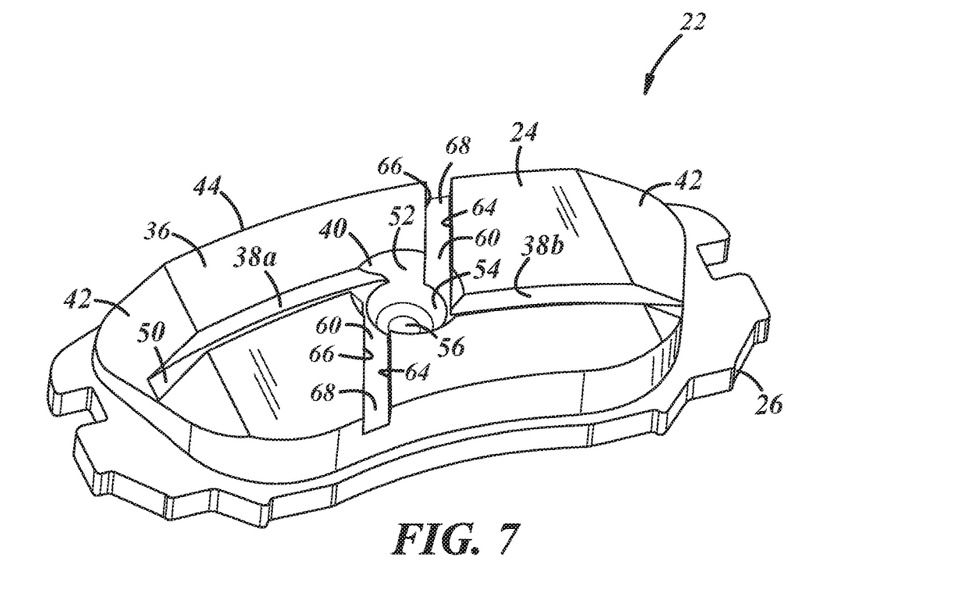
FIGS. 7-8 show brake pads with friction linings in accordance with one embodiment.

As shown in FIG. 7, embodiments may include one or more vertical slots 60 in the friction lining 24 of a brake pad 22. In this particular embodiment, two vertical slots 60 extend from the top and bottom of the outer perimeter 44 of the friction lining 24, respectively, to join, communicate, or otherwise terminate at the vortex zone 40. As with the horizontal slots 38a, 38b, vertical slots 60 may include side walls 64, 66 and a bottom wall 68. The same variations, alternatives, configurations, etc. described above with respect to the horizontal slots are also applicable with respect to vertical slots.

Figure 8:
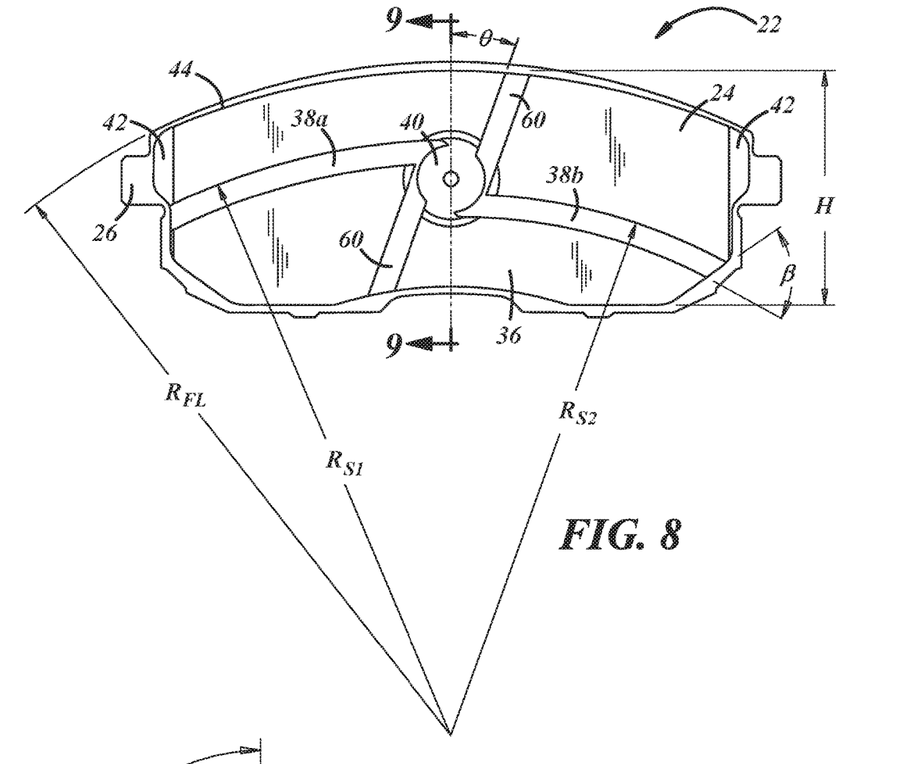
Figure 9:
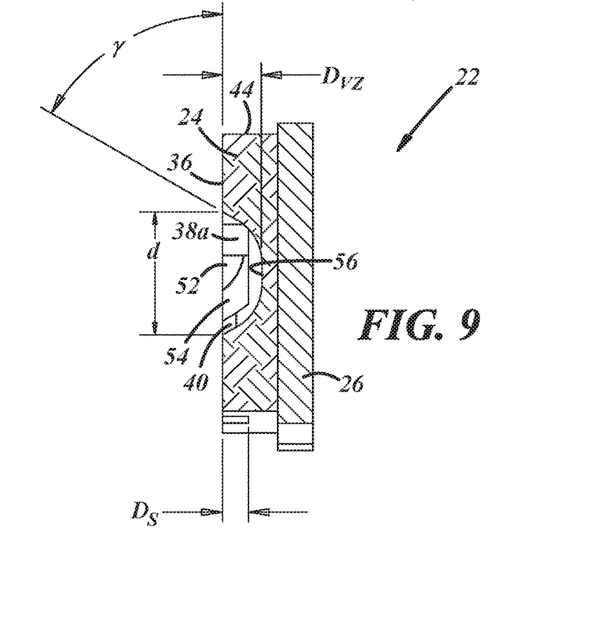
FIG. 9 is a cross-sectional view of the brake pad of FIG. 8 taken along line 9-9 of FIG. 8.

FIGS. 8 and 9 are drawings of another embodiment of brake pad 22 having two horizontal slots 38a, 38b and two vertical slots 60 which all converge at vortex zone 40. FIG. 9 is a cross-sectional view of the friction lining 24 of FIG. 8 taken along line 9-9 of FIG. 8. In this particular embodiment, with reference to FIG. 8, the arc of the top edge of the outer perimeter 44 of the friction lining 24 is generally defined by radius R. The horizontal slots 38a, 38b each have an arc that is generally defined by a radius $R_{S1}$ and $R_{S2}$, respectively. The arcs defined by the radii $R_{FL}$, $R_{S1}$, and $R_{S2}$ are concentric, but need not be in at least some embodiments. Further, the arcs defined by the radii $R_{FL}$, $R_{S1}$, and $R_{S2}$ may be concentric with the outer perimeter 32 of the rotor 30 in braking system 20. It will be appreciated by those skilled in the art that in other embodiments this concentricity is not required and that therefore the center points of the radii of the slots 38a, 38b may be different than each other or different than that of either the top edge of perimeter 44 or that of the rotor outer perimeter 32 once installed.

FIG. 8 also shows that the horizontal slot 38b may define an angle β with the outer perimeter 44 of the friction lining 24. In one implementation, angle β is greater than or equal to 54°. The vertical slots 60 may define an angle θ with respect to the center line of the friction lining. In this embodiment, angle θ is 20° but may vary depending on the particular slot configuration. FIG. 9 shows that the radial surface 54 of the interior wall 52 of the vortex zone 40 can form an angle γ with the friction surface 36 of the friction lining 24. In the illustrated embodiment, the angle γ is 60°, but the angle γ may be between 50° and 70°, inclusive. FIG. 9 also varies from the previously illustrated cross-sectional view of friction lining 24 in that the slot depth $D_S$ is 2/3 of the vortex zone depth $D_{VZ}$.

Figure 10:
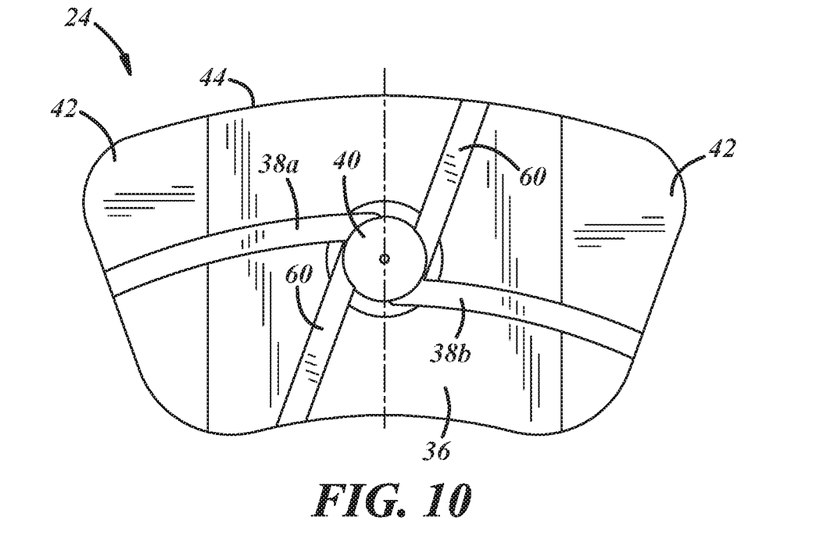
FIGS. 10-14 show friction linings according to various embodiments.
Figure 11:
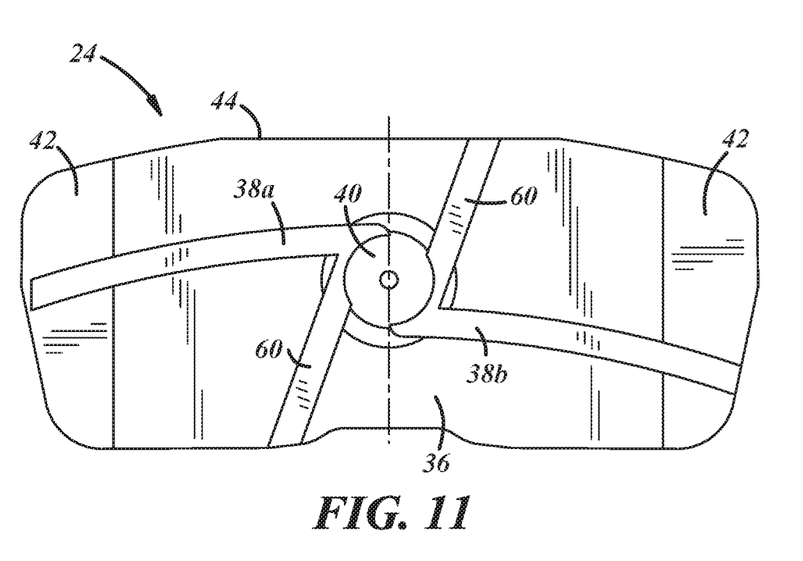
Figure 12:
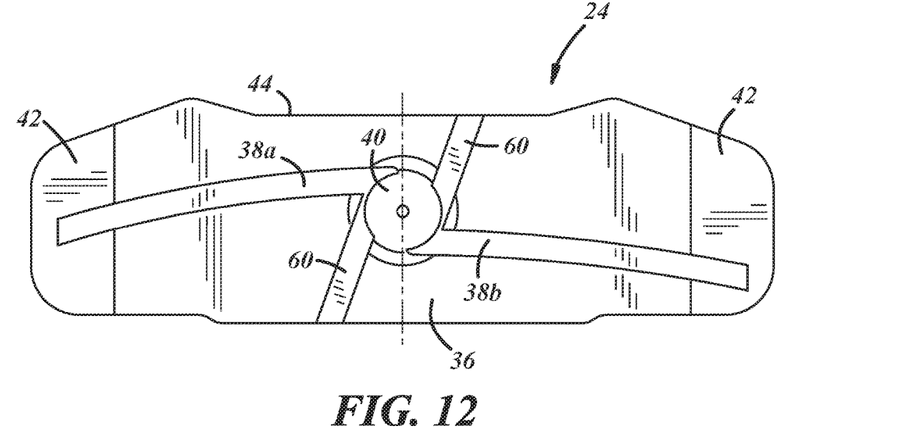
Figure 13:
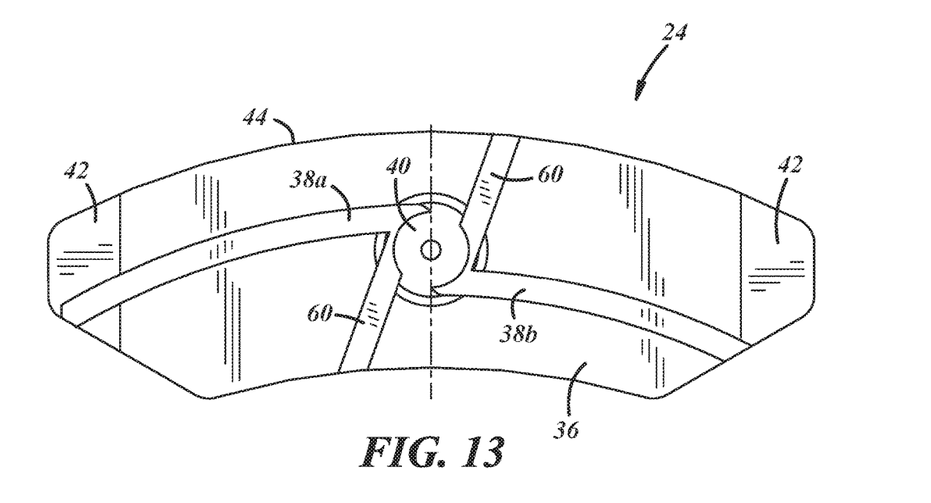

FIGS. 10-13 illustrate friction linings 24 having various configurations for the outer perimeter 44, horizontal slots 38a, 38b, and chamfers 42. In the illustrated embodiments, two pairs of horizontal slots 38 and two pairs of vertical slots 60 intersect or otherwise join at the vortex zone 40, which is centrally located with respect to the friction surface 36 and friction lining 24 in general. In FIG. 10, the horizontal slots 38a, 38b each extend all the way through the chamfer 42 to the outer perimeter 44. In FIG. 11, one horizontal slot 38b ends in the chamfer 42 while the other horizontal slot 38a extends to the outer perimeter 44. In FIG. 12, both horizontal slots 38a, 38b end prior to the outer perimeter 44. In FIG. 13, both horizontal slots 38a, 38b end at the outer perimeter 44, with one slot 38a ending in the chamfer 42 and the other slot 38b generally ending at the edge of the friction surface 36.

Figure 14:
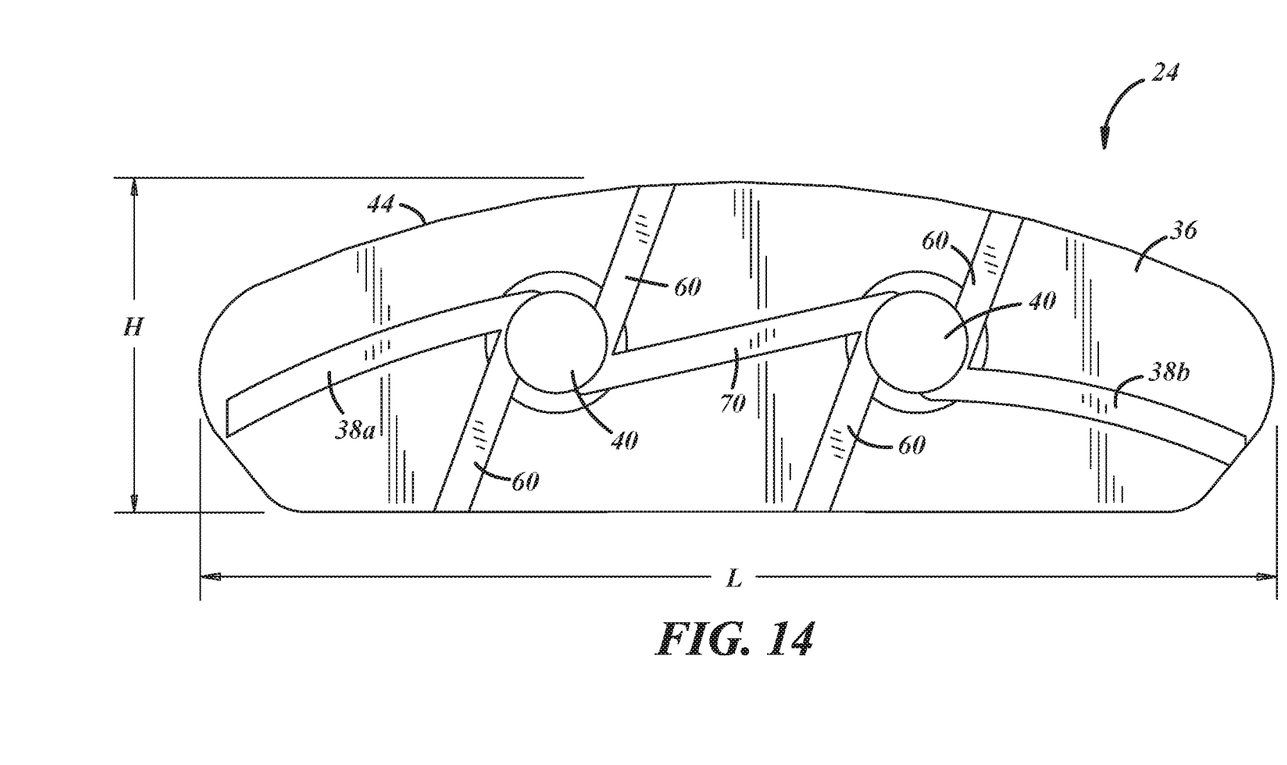

FIG. 14 shows a friction lining 24 having two vortex zones 40 located in a central region of the solid body and being joined by a connecting slot 70. This particular embodiment includes two horizontal slots 38a, 38b extending from their respective side edge of the outer perimeter 44 of the friction lining 24 to one of the two vortex zones 40, respectively. Each vortex zone 40 includes a pair of vertical slots 60 extending from each vortex zone to the top and bottom of the outer perimeter 44 of the friction lining 24, respectively. However, it is possible to have a friction lining 24 with multiple vortex zones 40 without the vertical slots 60. Connecting slot 70 is situated between the two vortex zones 40. Connecting slot 70 may be straight as shown, or it may have an arced configuration. While it may be preferable to include one vortex zone 40 toward the center of the friction lining 24, two or more vortex zones may be desirable where there is a large friction surface area, or as illustrated, the length L is two or more times larger than the height H of the friction lining 24.

Figure 15:
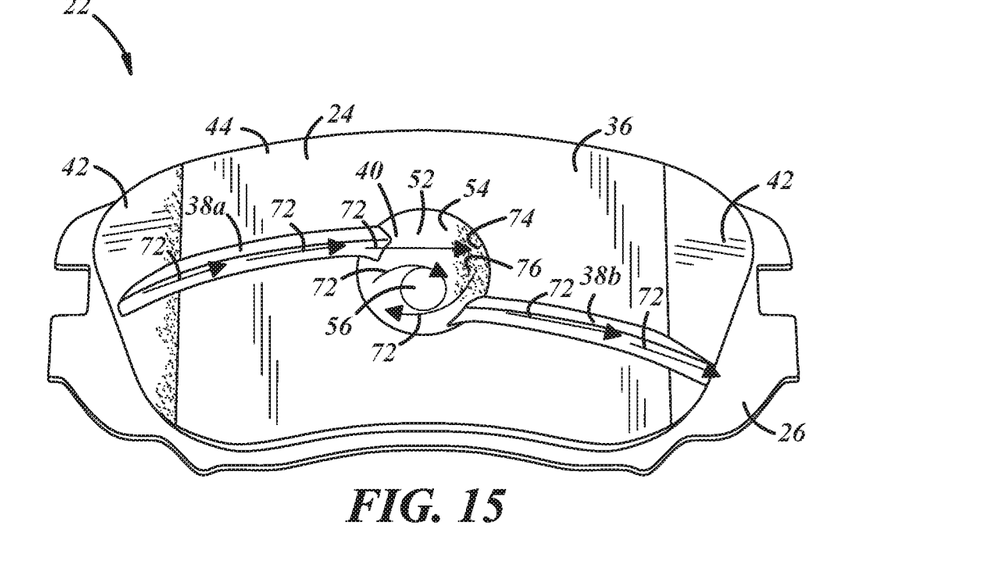
FIGS. 15-16 are brake pads having friction linings illustrating the expected airflow across the friction linings.
Figure 16:
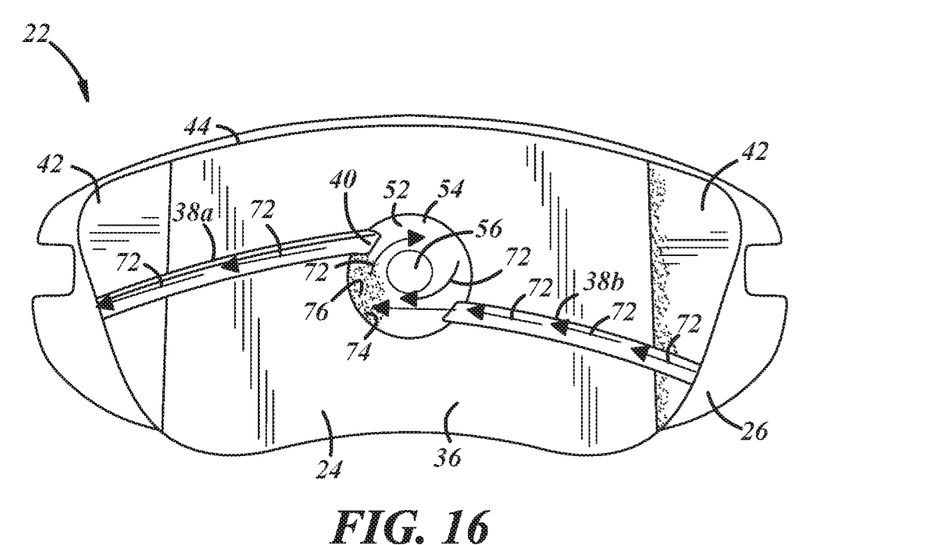

FIGS. 15 and 16 are images of brake pads 22 that were subject to testing to show the airflow pattern across the friction lining 24. FIG. 15 shows the inner pad, and FIG. 16 shows the outer pad, where "inner" and "outer" refer to the position of the friction lining relative to brake pad position in the caliper. Accordingly, the arrows 72 which represent the airflow are generally in line with the rotor rotation (i.e., the left side of FIG. 15 represents the leading edge while the right side of FIG. 16 represents the leading edge). For this test, a colored, fine particulate matter (illustrated as shaded areas 74 and 76, described below) was sprayed toward the spinning rotor surface 180° opposite of the caliper whereupon the moving airflow concomitant with the spinning rotor carried the dust cloud into the friction linings of the depicted brake pad embodiments. The testing showed that the colored, fine particulate matter was blown and focused toward contact point 74 on the radial surface 54 of the interior wall 52 of the vortex zone 40. The colored, fine particulate matter then left a trailing edge 76 along the radial surface 54 as airflow continued in a circular fashion within in the vortex zone 40.

Figure 17:
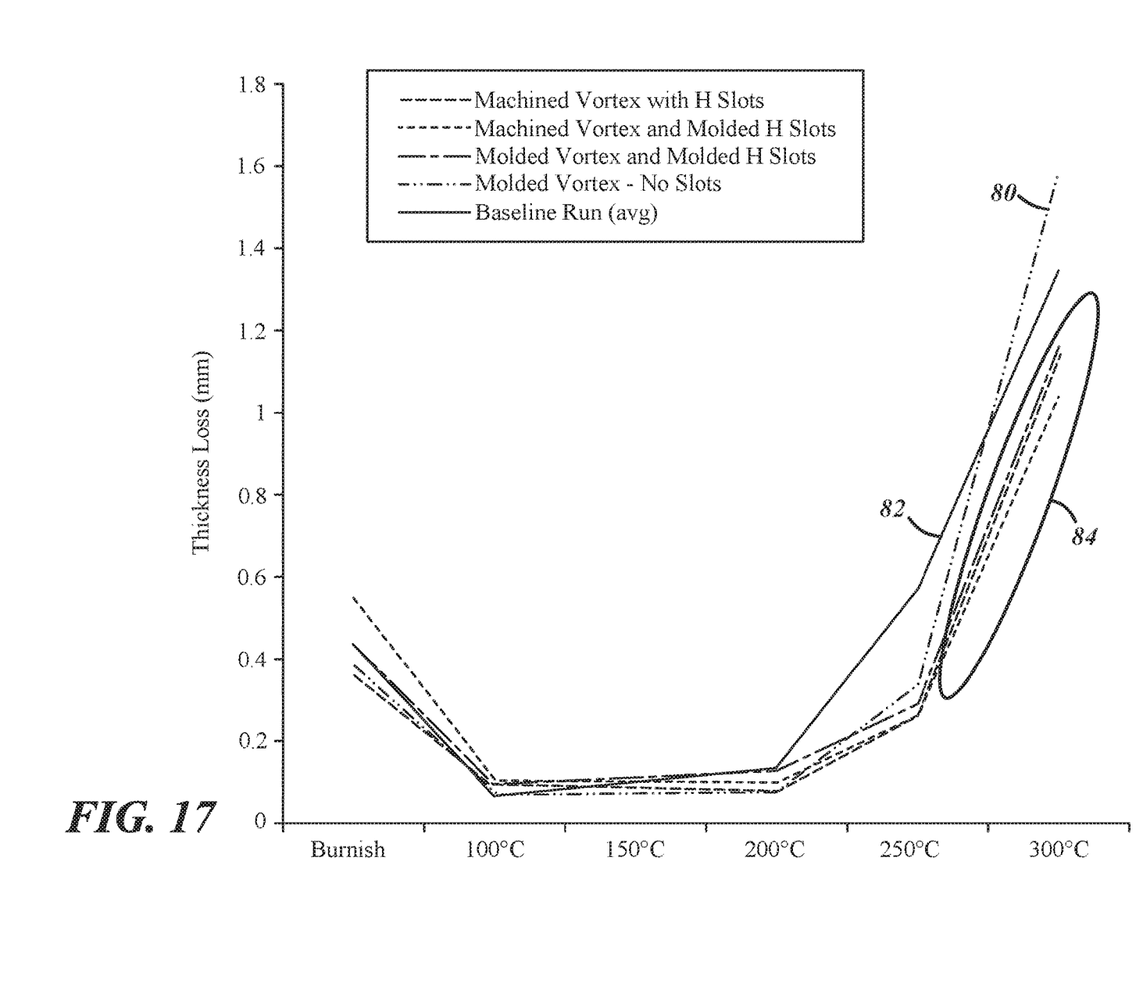
FIG. 17 is a graph showing friction wear test results for various types of friction linings.

FIG. 17 is a graph showing wear testing results for various types of friction linings. In particular, 80 represents a friction lining with a vortex zone but without slots, 82 represents a friction lining with no airflow features, and 84 (circled group) represent friction linings having a vortex zone and various slot configurations. Lower thickness loss at a given temperature may be generally preferred. Accordingly, FIG. 17 shows that the inclusion of airflow features such as vortex holes and slots in the friction linings has a cooling effect that reduces wear, and may ultimately increase the overall brake pad life.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, although the illustrated embodiments disclose use of the friction pads with complex edge profiles on disk brake pads, it will be appreciated that those complex edge profile designs may be utilized on drum brake pads as well. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A friction lining for a brake pad, comprising:
a solid body of friction material having plurality of slots joined at a vortex zone, wherein at least one of the plurality of slots has a different depth or width than another one of the plurality of slots,
wherein the slots are offset from each other with respect to a height of the solid body,
and wherein at least one of the slots has a depth from a friction surface of the solid body that is between 50% and 75%, inclusive, of a depth of the vortex zone from the friction surface.

2. The friction lining of claim 1, wherein the vortex zone comprises a recess that extends from a friction surface of the solid body down into the solid body, and wherein the plurality of slots comprises at least first and second slots, the slots opening into the vortex zone along non- intersecting paths at locations that are offset from each other.

3. The friction lining of claim 2, wherein the recess has a circular shape and the first and second slots each open into the vortex zone in a substantially tangential direction relative to the circular shape of the recess to thereby provide tangential entry/exit passages such that air entering the vortex zone from one of the slots flows in a curved direction within the vortex zone before exiting via the other slot.

4. The friction lining of claim 1, wherein the plurality of slots are configured to facilitate circular airflow within the vortex zone.

5. The friction lining of claim 1, wherein the solid body has a height across a friction surface of the solid body, and the vortex zone has a diameter at the friction surface that is between 38% and 55%, inclusive, of the height.

6. The friction lining of claim 5, wherein the vortex zone extends from the friction surface down into the solid body to a depression surface at a depth below the friction surface, and wherein the thickness of the solid body at the depression surface is approximately 0.1 inches.

7. A friction lining for a brake pad, comprising:
a solid body of friction material having plurality of slots joined at a vortex zone, wherein at least one of the slots is an arced horizontal slot configured to follow a concentric path of a point on a brake rotor with which the friction lining contacts when in use, wherein the vortex zone comprises a circular shaped recess that extends from a friction surface of the solid body down into the solid body, wherein the arced horizontal slot is configured to provide an entry passage to the circular shaped recess such that air entering the vortex zone from the arced horizontal slot flows in a curved direction within the vortex zone, and wherein the plurality of slots comprises at least first and second slots, the first and second slots opening into the vortex zone along non-intersecting paths at locations that are offset from each other.

8. The friction lining of claim 7, wherein the slots are offset from each other with respect to a height of the solid body.

9. A friction lining for a brake pad, comprising:
a solid body of friction material having a length extending in a horizontal direction and a height extending in a vertical direction that is less than the length,
the solid body having a horizontal slot extending from a leading edge of the solid body to a trailing edge of the solid body, the horizontal slot including a first slot extending inwardly from the leading edge and a second slot extending inwardly from the trailing edge,
the solid body including a recess located at a central region of the solid body,
wherein the first and second slots open into the recess in the solid body so as to permit airflow between the first and second slots via the recess,
wherein the recess has a circular shape and extends into the solid body from a surface of the solid body down to a bottom of the recess, wherein the bottom has a depth from the surface of the solid body that is greater than a depth of each of the first and second slots, and wherein the first and second slots are offset relative to each other at the recess, with at least one of the first and second slots opening into the recess in a substantially tangential direction relative to the circular shape of the recess, whereby air entering the recess from at least one of the slots flows in a curved direction within the recess.

10. The friction lining of claim 9, wherein the surface of the solid body comprises a friction surface that bears against a brake rotor when in use.

11. The friction lining of claim 9, wherein the recess extends only partially through the thickness of the solid body.

12. A brake pad comprising a backing plate and a friction lining as defined in claim 9 attached to the backing plate.

13. A braking system, comprising:
a rotor having a disk shape with opposite sides extending radially to an outer circumference; and
a brake pad having a friction lining and arranged relative to the rotor such that a friction surface of the friction lining bears against one of the sides of the rotor to inhibit rotation of the rotor when in use;
wherein the friction lining has an arced horizontal slot formed from two offset slots interconnected at a central region of the friction lining such that, when in use, airflow entering one of the offset slots exits via the other of the offset slots; and wherein each of the offset slots extend along an arc that follows a concentric path of a point on the rotor when in use.

14. The braking system of claim 13, wherein the brake pad includes a vortex zone joining the two offset slots.

15. The braking system of claim 14, wherein the vortex zone comprises a recess having a circular shape that extends into the solid body from the friction surface of the friction lining down to a bottom of the recess, wherein the bottom has a depth from the surface of the solid body that is greater than a depth of each of the offset slots, and wherein the offset slots open into the recess in a substantially tangential direction relative to the circular shape of the recess, whereby air entering the recess from one of the offset slots flows in a curved direction within the recess before exiting the recess via the other offset slot.

16. The braking system of claim 14, wherein the friction lining has a radially-extending height and the vortex zone has a diameter at the friction surface that is between 38% and 55%, inclusive, of the height.

17. The braking system of claim 14, wherein the friction lining includes a pair of vertically extending offset slots each extending from an edge of the friction lining to the vortex zone.

18. The braking system of claim 13, wherein the horizontal slot extends across an entire horizontal length of the friction lining.

* * * * *